United States Patent
Chevalier et al.

(10) Patent No.: US 11,199,525 B2
(45) Date of Patent: Dec. 14, 2021

(54) ULTRASONIC BAR INSPECTION SYSTEM WITH IMPROVED CENTERING ASSEMBLY

(71) Applicant: OLYMPUS AMERICA INC., Center Valley, PA (US)

(72) Inventors: David-Alexandre Roy Chevalier, Lévis (CA); Christian Gagnon-Lachance, Lévis (CA)

(73) Assignee: Olympus America Inc., Center Valley, PA (US)

( * ) Notice: Subject to any disclaimer, the term of this patent is extended or adjusted under 35 U.S.C. 154(b) by 376 days.

(21) Appl. No.: 16/277,459

(22) Filed: Feb. 15, 2019

(65) Prior Publication Data

US 2020/0264138 A1    Aug. 20, 2020

(51) Int. Cl.
*G01N 29/22* (2006.01)
*G01N 29/24* (2006.01)
*G01N 29/27* (2006.01)
*G01N 29/04* (2006.01)

(52) U.S. Cl.
CPC ......... *G01N 29/225* (2013.01); *G01N 29/041* (2013.01); *G01N 29/043* (2013.01); *G01N 29/24* (2013.01); *G01N 29/27* (2013.01); *G01N 2291/0289* (2013.01); *G01N 2291/106* (2013.01); *G01N 2291/2626* (2013.01); *G01N 2291/2634* (2013.01)

(58) Field of Classification Search
CPC ................ G01N 29/225; G01N 29/27; G01N 2291/2626; G01N 2291/2634; G01N 29/041; G01N 29/043; G01N 29/24; G01N 2291/0289; G01N 2291/106
USPC ........................... 73/620, 622, 634, 633, 637
See application file for complete search history.

(56) References Cited

U.S. PATENT DOCUMENTS

| | | | | |
|---|---|---|---|---|
| 4,328,708 A | * | 5/1982 | Bagwell | G01N 29/26 73/622 |
| 4,531,413 A | * | 7/1985 | Tsuchita | B82Y 15/00 73/637 |
| 4,655,085 A | * | 4/1987 | Tomizawa | G01N 29/26 73/638 |

(Continued)

FOREIGN PATENT DOCUMENTS

CN      111579649 A     8/2020

OTHER PUBLICATIONS

"European Application Serial No. 20157202.1, Extended European Search Report dated Jul. 17, 2020", 6 pgs.

(Continued)

*Primary Examiner* — Lisa M Caputo
*Assistant Examiner* — Rose M Miller
(74) *Attorney, Agent, or Firm* — Schwegman Lundberg & Woessner, P.A.

(57) ABSTRACT

Disclosed is an ultrasonic bar or tube inspection assembly comprising two centering assemblies and two inspection cassettes. The centering assemblies are designed to guide the bar under inspection with rollers disposed on symmetrically arranged pivot arms activated by a single centering ring. A pressure plate is designed to push the probe cassettes to be stacked tightly and concentrically onto the centering assembly. The inspection probe cassettes, with the accompanying design of engagement grooves and ridges, and a pressure plate, may be easily removed from the bar inspection assembly for maintenance operations.

21 Claims, 8 Drawing Sheets

(56) References Cited

U.S. PATENT DOCUMENTS

| | | | | |
|---|---|---|---|---|
| 5,313,837 A | * | 5/1994 | Haynes | G01N 29/265 |
| | | | | 73/622 |
| 8,264,221 B2 | | 9/2012 | Faucher et al. | |
| 2010/0275694 A1 | | 11/2010 | Roberts | |
| 2014/0190262 A1 | * | 7/2014 | Meinert | G01N 29/225 |
| | | | | 73/584 |

OTHER PUBLICATIONS

"European Application Serial No. 20157202.1, Response filed Feb. 16, 2021 to Extended European Search Report dated Jul. 17, 2020", 48 pgs.

* cited by examiner

ULTRASONIC BAR INSPECTION SYSTEM WITH IMPROVED CENTERING ASSEMBLY

FIELD

Example embodiments of the present disclosure relate to non-destructive testing and inspection (NDT/NDI) of metal bars and, in particular, to a system with improved accuracy of alignment between the ultrasonic probes and the bar being held by a centering assembly.

BACKGROUND

Ultrasonic methods are commonly used for testing solid bars for cracks, voids, and inclusions. Often manual inspection is not practical for 100% inspection of such products because of the time required for full volumetric inspection. High throughput automated ultrasonic testing may be performed using one or more transducers, with the transducers usually being immersed in a water tank to maintain acoustic coupling. By using several probes at once and moving the product relative to the probes, inspection speed and probability of defect detection can be increased. Further advantages can be gained through the use of automated phased array systems (PA), which utilize multiple-element probes and electronic beam steering to direct and focus sound beams.

SUMMARY

In the example embodiments of the present disclosure, it is provided a non-destructive inspection system configured to perform an inspection on a test object with a longitudinal shape being passed through the inspection system in an axial direction. The inspection system comprises a pair of centering assembly which includes a circular centering frame centered around a system axis. The centering frame has at least three pivot arms having respective first ends pivotably attached to the centering frame at respective pivotal joints spaced substantially equally around the centering frame. The pivot arms also have respective second ends configured to tangentially engage the test object at times the inspection system is in operation. The inspection system also comprises at least one circular probe cassette, configured to carry inspection probes. Also included in the inspection system is a pair of locking components configured respectively on the centering frame and the probe cassette to align the probe cassette to be centered along the system axis when the locking components are in an engaged position.

The centering frame and the probe cassette are installed in two separate redial planes, perpendicular to the axial direction.

Further included in the inspection system is a pressure plate sandwiched between the centering frame and the probe cassette and configured with a pushing mechanism, which when actuated, pushing the probe cassette and the centering frame into the engaged position so that the center axis of the probe cassette is concentric to the center axis (the system axis of the centering frame.

DETAILED DESCRIPTION OF PREFERRED EMBODIMENT

Traditional inspection systems may experience a mechanical tolerance stack up between the position of the probes and the position of the bar. For example, the bar may not be straight, and the bar cross-section may not be uniform, yet the centering mechanism must maintain a constant relationship between the bar centerline and the probes. Therefore, in order to move the bar relative to the probes at high speed, conventional ultrasonic bar inspection systems use a centering mechanism to guide and center passage of the bar.

However, such traditional ultrasonic bar inspection systems experience several deficiencies. For example, the centering mechanism may be subject to tolerance errors leading to misalignment of the central axes of the centering assembly and the probes. Further, a lack of radial symmetry in the parts of the centering mechanism or their arrangement, such as that disclosed in Faucher et al (U.S. Pat. No. 8,264,221), may cause location errors of the bar relative to the desired center of the centering mechanism and may create differing forces to be applied to those parts. This asymmetrical distribution of forces may cause asymmetrical wear of the parts, causing further errors in centering of the bar, and may cause the bar to impact portions of the ultrasonic bar inspection system causing premature failure of the system or its parts. Ease of assembly and maintenance is a further problem with conventional ultrasonic bar inspection systems.

Therefore, example embodiments of the present disclosure provide a bar inspection assembly having improved alignment accuracy between the centering assembly and the probe assembly, improved accuracy of the centering mechanism, and improved resistance to alignment errors due to non-uniform forces and non-uniform wear of components.

Figure 1:
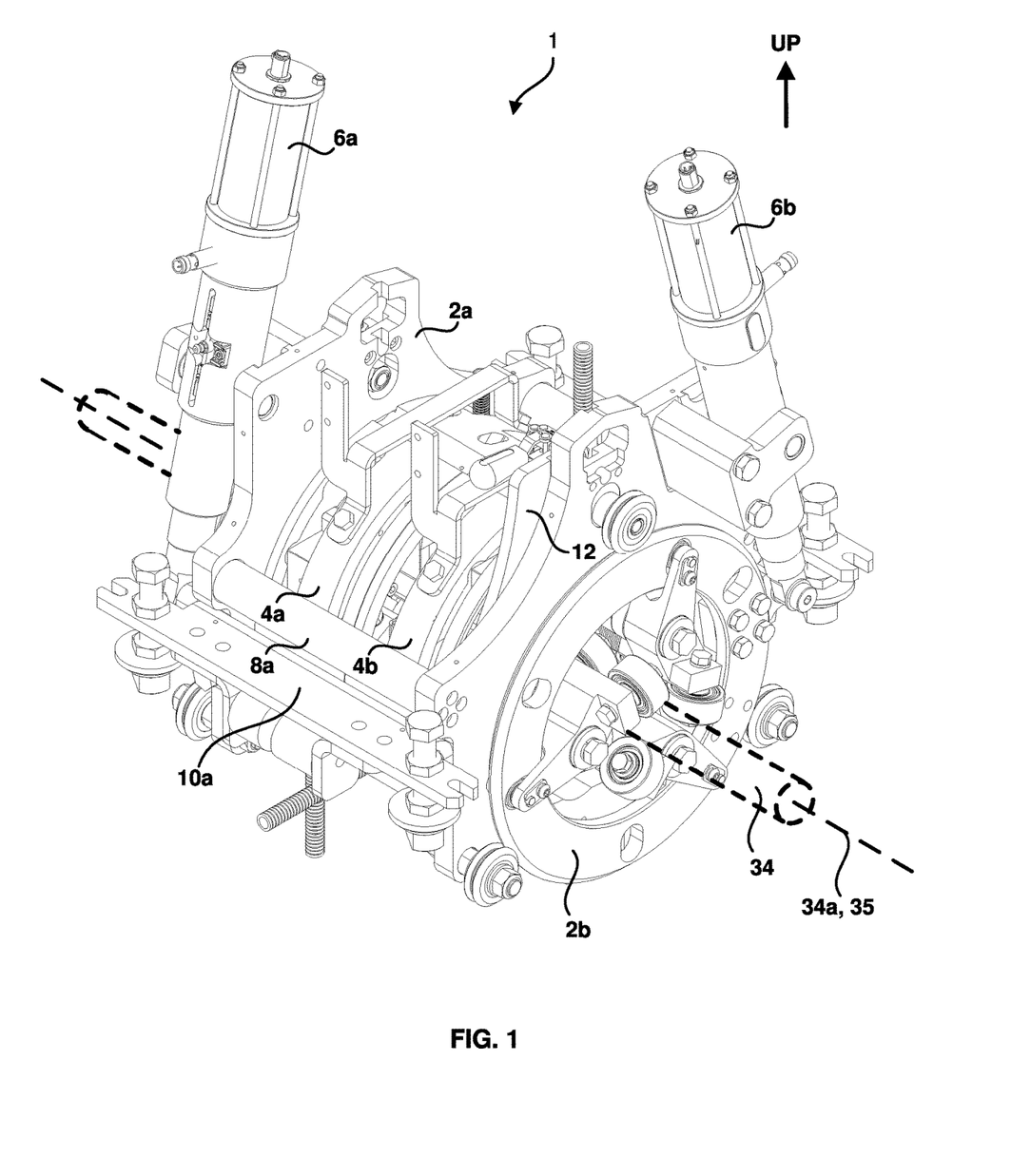
FIG. 1 is an isometric view of a bar inspection system according to an example embodiment of the present disclosure.
Figure 2:
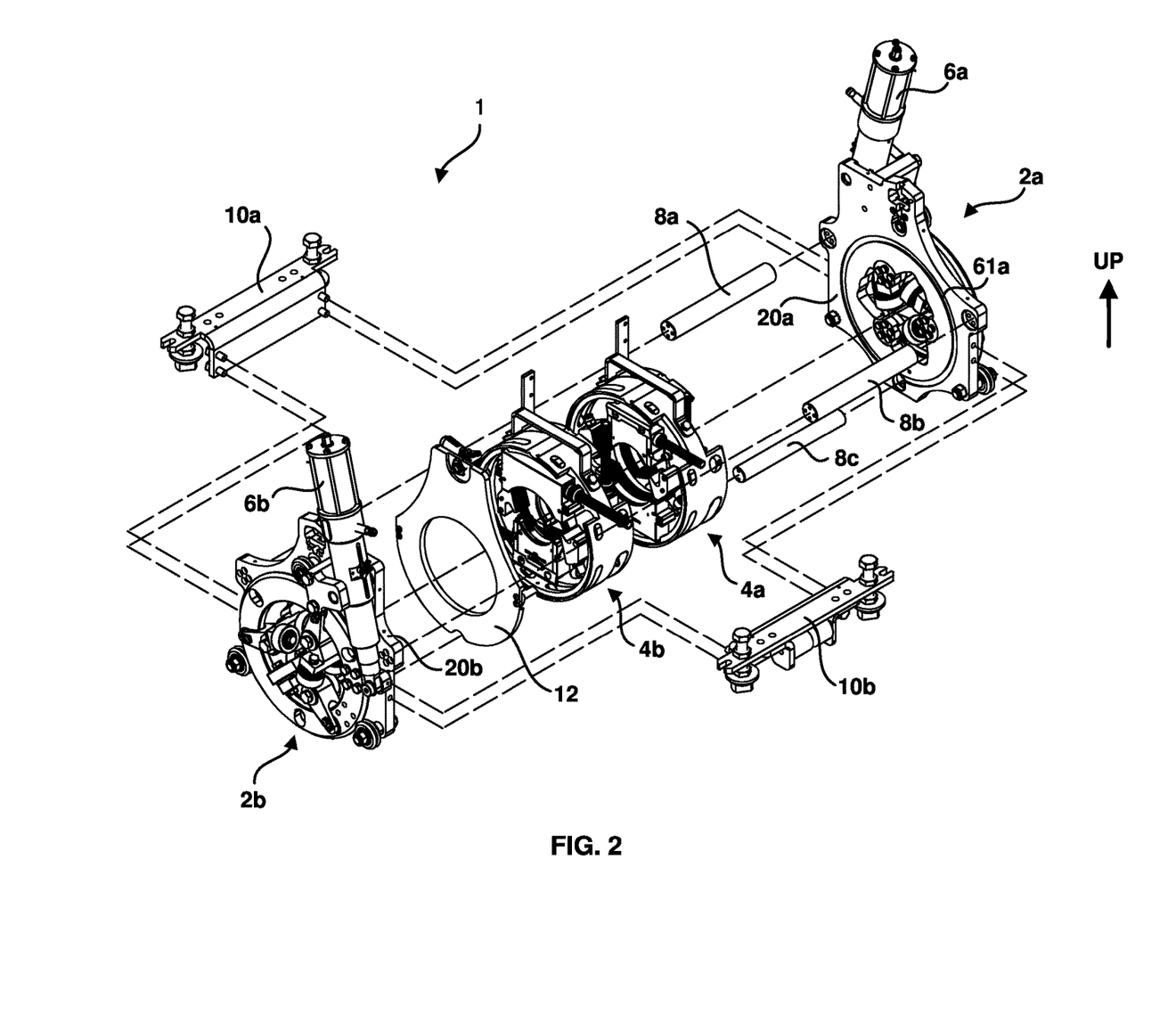
FIG. 2 is an exploded view of the bar inspection system according to the example embodiment of the present disclosure shown in FIG. 1.

FIG. 1 shows an isometric view of a bar or tube inspection system 1 according to an example embodiment of the present disclosure. The inspection system 1 is shown inspecting a bar 34 (shown in dotted outline) being fed in an axial direction along a system axis 35 which in ideal condition is concentric with a bar axis 34a. FIG. 2 shows an exploded view of bar inspection system 1. Referring to FIGS. 1 and 2, the inspection system 1 comprises two centering assemblies 2a and 2b integrated with two inspection cassettes 4a and 4b and a pressure plate 12. Centering assemblies 2a and 2b comprise centering assembly main plates 20a and 20b, respectively. A part of centering actuators 6a and 6b are partially attached to main plates 20a and 20b, respectively. More detailed description of centering assemblies 2a and 2b can be found later in the description in association with FIG. 5 of this disclosure.

At times of operation, centering assemblies 2a and 2b, inspection cassettes 4a and 4b, and pressure plate 12 are rigidly held together, partially by three rigid links 8a, 8b and 8c located on the periphery of bar inspection system 1. Bar inspection system 1 is supported by suspension supports 10a and 10b at the bottom part of system 1. This allows limited freedom of movement of bar inspection system 1 in response to forces exerted by bar 34 on centering assemblies 2a and 2b, for example due to non-linearity or non-uniformity of bar 34. Centering assemblies 2a and 2b and inspection cassettes 4a and 4b all have respective centers, which are intended to be concentric along system axis 35 during inspection. It can be noted that system axis 35 is defined by the center of centering assemblies 2a and 2b.

It should be noted that inspection system 1 shown in the figures are oriented the same way as how system 1 is operated by an operator. Such as in FIG. 1, the "Up" arrow denotes to be the direction as "up". As an example, actuators 6a and 6b are positioned at the "upper" part of centering assembly for easy access by the operator.

It can also be noted that the centering assemblies 2a and 2b, the inspection cassettes 4a and 4b and pressure plate 12 are installed in their respective radial planes.

Figure 3A:
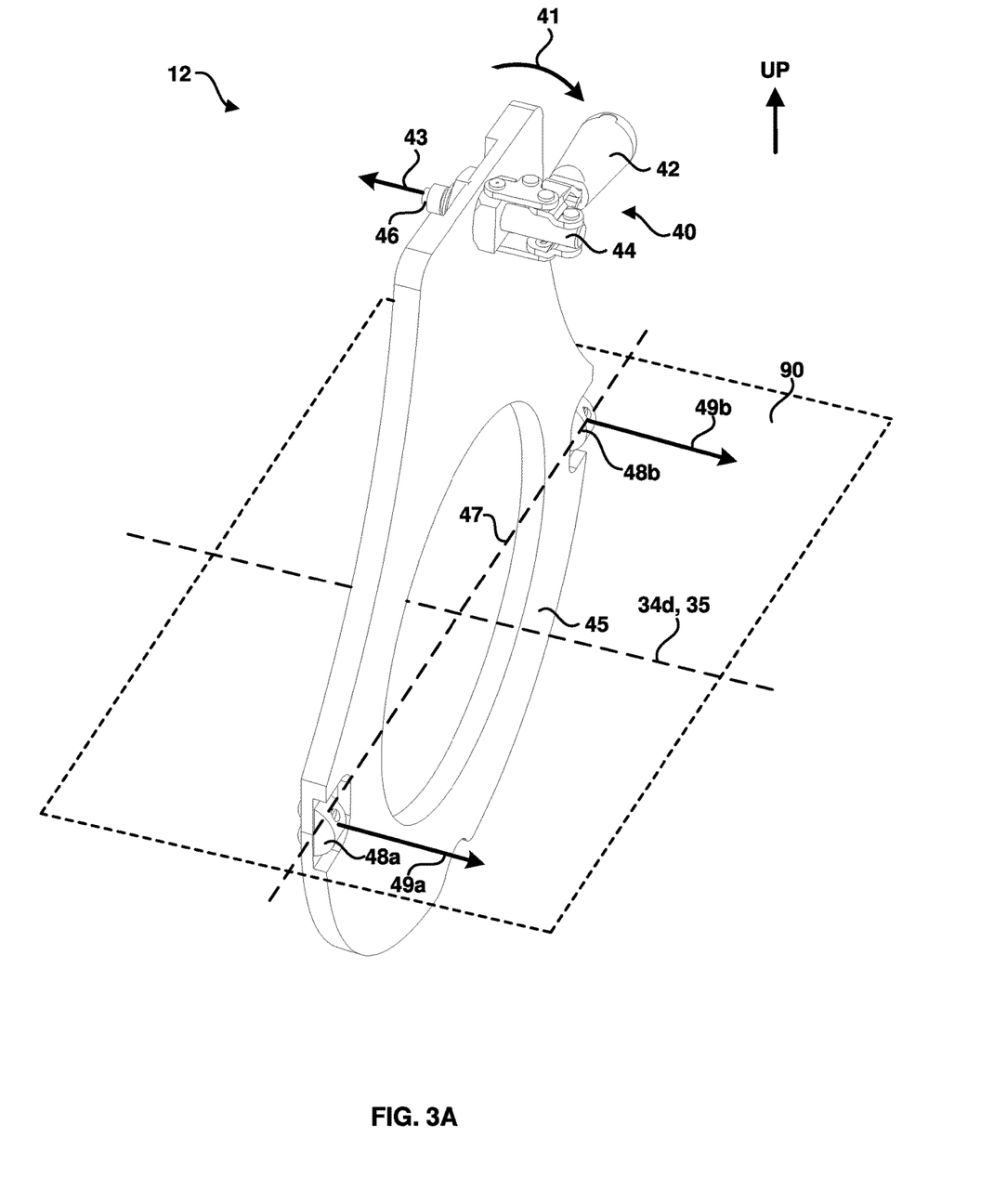
FIG. 3A is an isometric view of a pressure plate according to the example embodiment of the present disclosure.
Figure 4:
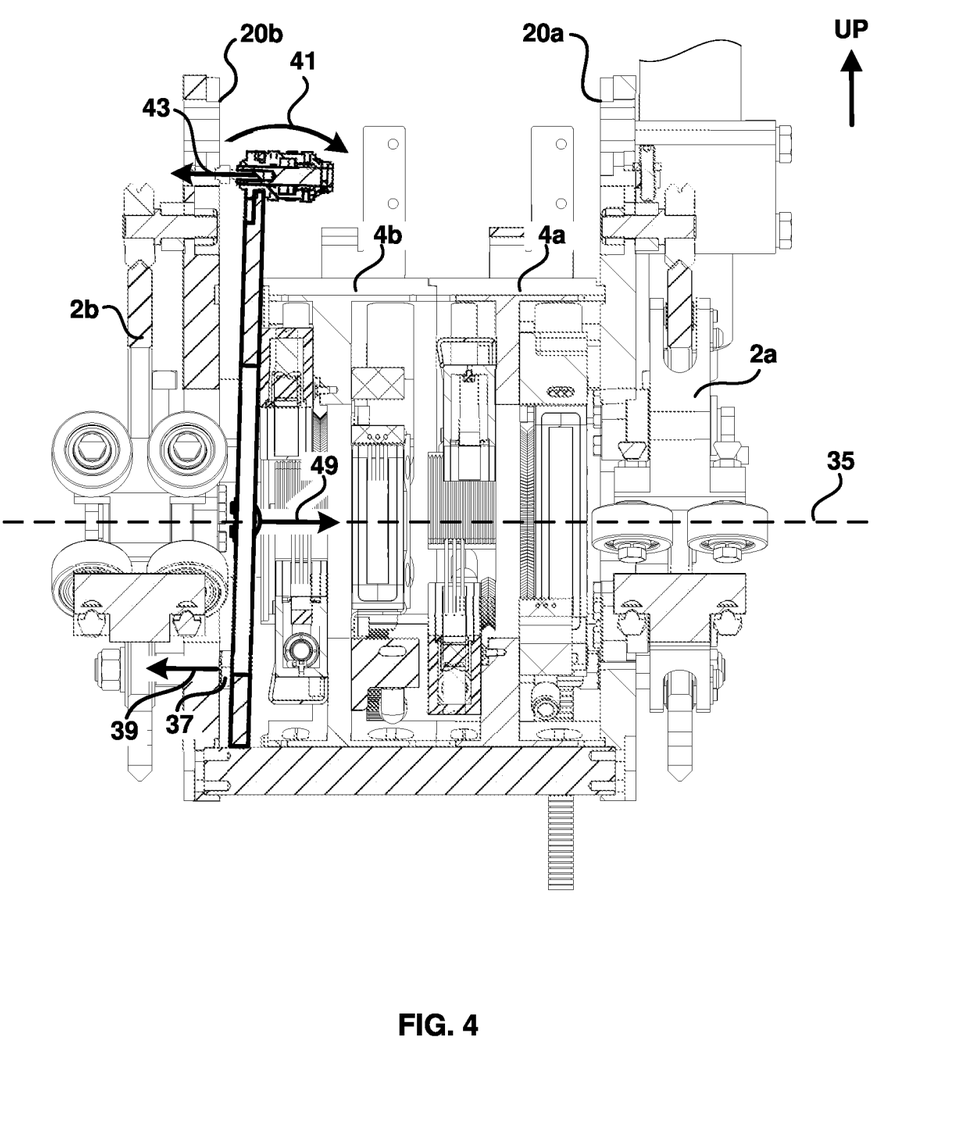
FIG. 4 is a cross-section view showing operation of the pressure plate of the bar inspection system according to the example embodiment of the present disclosure.

Referring to FIGS. 3A and 4, and continuing to refer to FIG. 2, pressure plate 12 is designed to provide a pushing mechanism to ensure that centering assemblies 2a and 2b and inspection cassettes 4a and 4b are tightly stacked together such that rigid links 8a, 8b and 8c are all in tension, thereby minimizing misalignment or tolerance errors. Pressure plate 12 comprises a pressure plate body 45 and a toggle clamp 40 having a handle 42, a toggle clamp mechanism 44 and a toggle clamp shaft 46.

Toggle clamp 40 is located at the upper part of pressure plate 12, easily to be accessed by the operator. Handle 42 has an actuated position in which toggle clamp shaft 46 is extended out away from toggle clamp 42 and an unactuated position in which toggle clamp shaft 46 is retracted from the extended position. When handle 42 is manually actuated, toggle clamp shaft 46 applies a toggle clamp force 43 pushing onto an upper part of centering assembly main plate 20b.

Figure 3B:
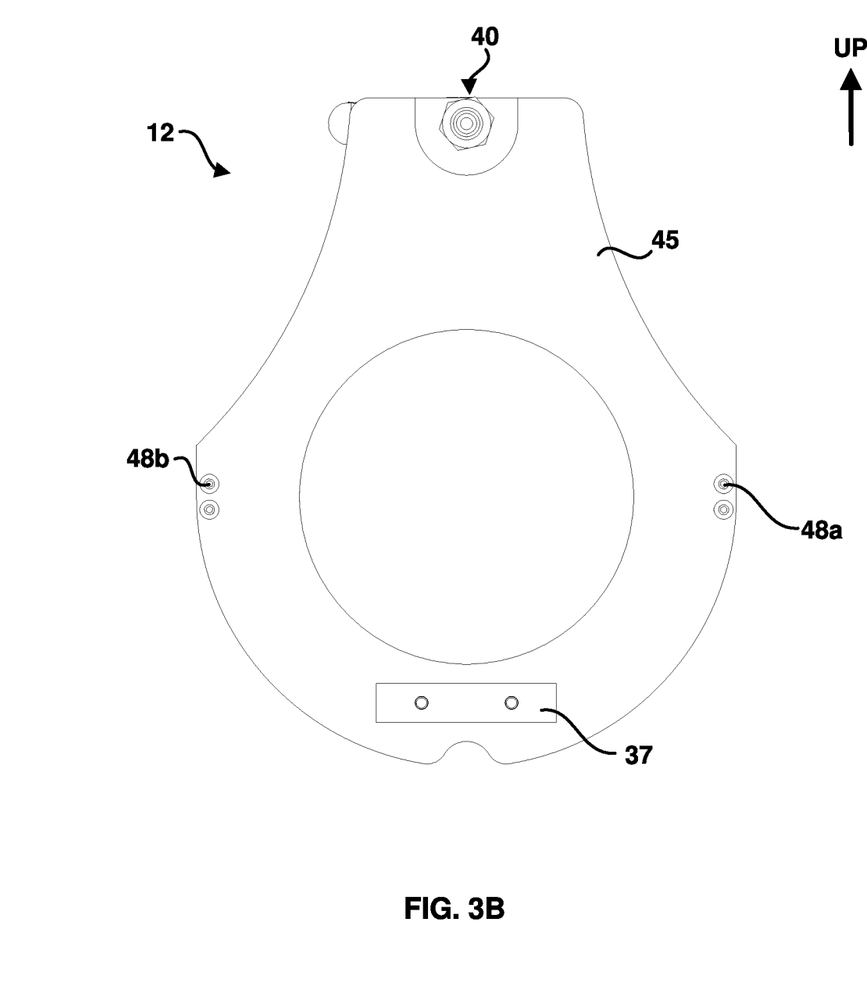
FIGS. 3B and 3C are a back view and a side view, respectively, of the pressure plate according to the example embodiment of the present disclosure.
Figure 3C:
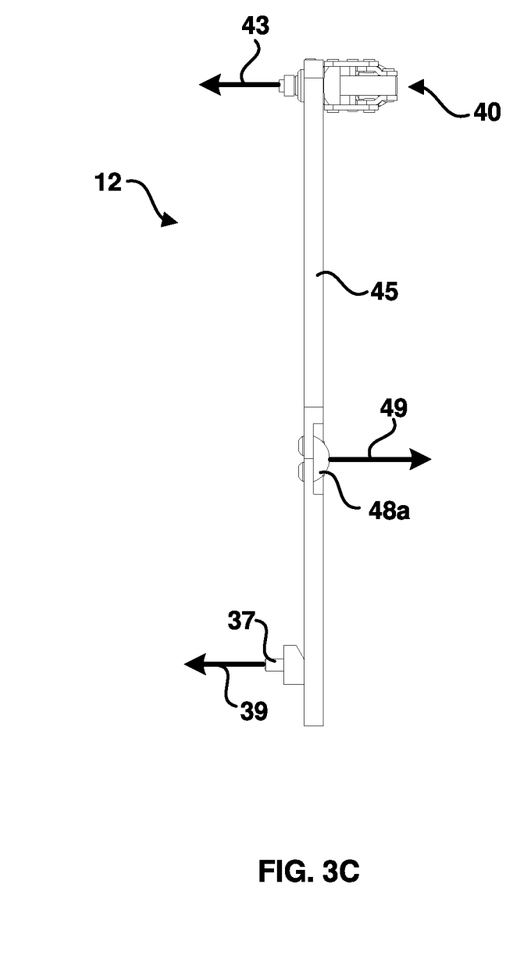

As shown in FIGS. 3B and 3C, a pair of pivot stands 48a and 48b are installed symmetrically on the edge of pressure plate body 45. A line connecting the pair of pivot stands 48a and 48b forms an axis 47. Toggle clamp force 43 results in a slight rotation 41 of body 45 about axis 47. A stopper 37 at the bottom part of pressure plate 12 functions to block this slight rotation 41, resulting compressive forces 49a and 49b to be transmitted via the pair of pivot stands 48a and 48b respectively to inspection cassette 4b.

If pressure plate 12 is viewed as a lever (more clearly shown in FIG. 3C), clamp shaft 40 and stopper 37 respectively on the top and bottom part of pressure plate 12, cause active and resistant forces 43 and 39, respectively, and pivot stands 48a and 48b function as fulcrums at the middle part of pressure plate 12, exerting compression force 49a and 49b on cassette 4b.

Referring to FIG. 4, compressive forces 49a and 49b are transmitted to inspection cassette 4b, which are then transmitted from inspection cassette 4b to inspection cassette 4a, and which push inspection cassette 4a against the centering assembly's main plate 20a. Thus inspection cassettes 4b and 4a are displaced until all components of bar inspection system 1 are tightly stacked and nested together, at which point application of further clamp force 43 serves to generate tension forces within rigid links 8a, 8b and 8c.

Referring to FIGS. 3A and 4, when toggle clamp 40 is inactivated, the toggle clamp shaft 46 is pulled away from pressuring on main plate 20b. As a result, resistant force 39 is release, and the pivot stands are returned to neutral position, away from pushing probe cassette 4b. This allows plate 12 freedom to be moved out, allowing the removal of cassette 4b. Note that when handle 42 is at inactivated position, i.e. when toggle clamp shaft 46 is retracted, the assembly is configured so that there are spaces between pressure plate 12 and inspection cassette 4b and between pressure plate 12 and centering assembly 2b, such that pressure plate 12 may be lifted out of the assembly. Referring back to FIG. 2, either or both of inspection cassettes 4a and 4b may then be lifted out of the assembly for purposes of maintenance or readjustment without disengaging rigid links 8a, 8b and 8c.

FIG. 4 provides a section view of pressure plate 12 in the context of inspection system 1, illustrating the operation of pressure plate 12 at times the components of bar inspection system 1 are tightly stacked and nested together. Note that pivot stands 48a and 48b are subject to wear during repeated operation of pressure plate 12, and they are therefore preferably replaceable parts which may be made of stainless steel or a low-friction plastic material such as nylon.

As shown in FIGS. 3A and 4, it can be noted that pressure plate body 45 is preferably configured to take a shape of roughly round ring slab, with a size compatible to that of centering cassettes 4a and 4b, and of main plate 20b and 20a. The size and shape of pressure plate body 45 is also configured so that, after assembly, center line 34d is aligned with system axis 35 shown in FIG. 1. The pair of pivot stands 48a and 48b are preferably configured to be near or at the peripheral edge of body 45, symmetrically positioned along a geometric center line 34d of plate body 45. Connecting line 47 are approximately in the same plane as center line 34d, and when system 1 is assembled, approximately in the same plane as system axis 35. This is the mechanism when pressure plate 12 pushes cassettes 4a, 4b to be concentrically engaged with main plate 20a, combined force 49 is exerted on the same plane with system axis 35, making sure pushing force is not off from the center defined system axis 35.

It should be appreciated that the positions of toggle clamp 40, pivot stands 48a and 48b and stopper 37 do not have to be exactly as shown in the example embodiment in FIGS. 3A-4. As long as the toggle clamp shaft and the stopper are respectively configured on a first side but two opposite edges of the pressure plate, and the pair of pivot stands configured on a second side but two opposite edges of the pressure plate in a fashion that a line connecting the toggle clamp shaft and the stopper is orthogonal to a line connecting the pair of pivot stands so that when the pushing mechanism is actuated, the toggle clamp shaft and the stopper causes an active and resistant force, respectively, and the pair of pivot stands functions as fulcrums pushing the locking components together. All these alternative embodiments are within the scope of the present disclosure.

Figure 5:
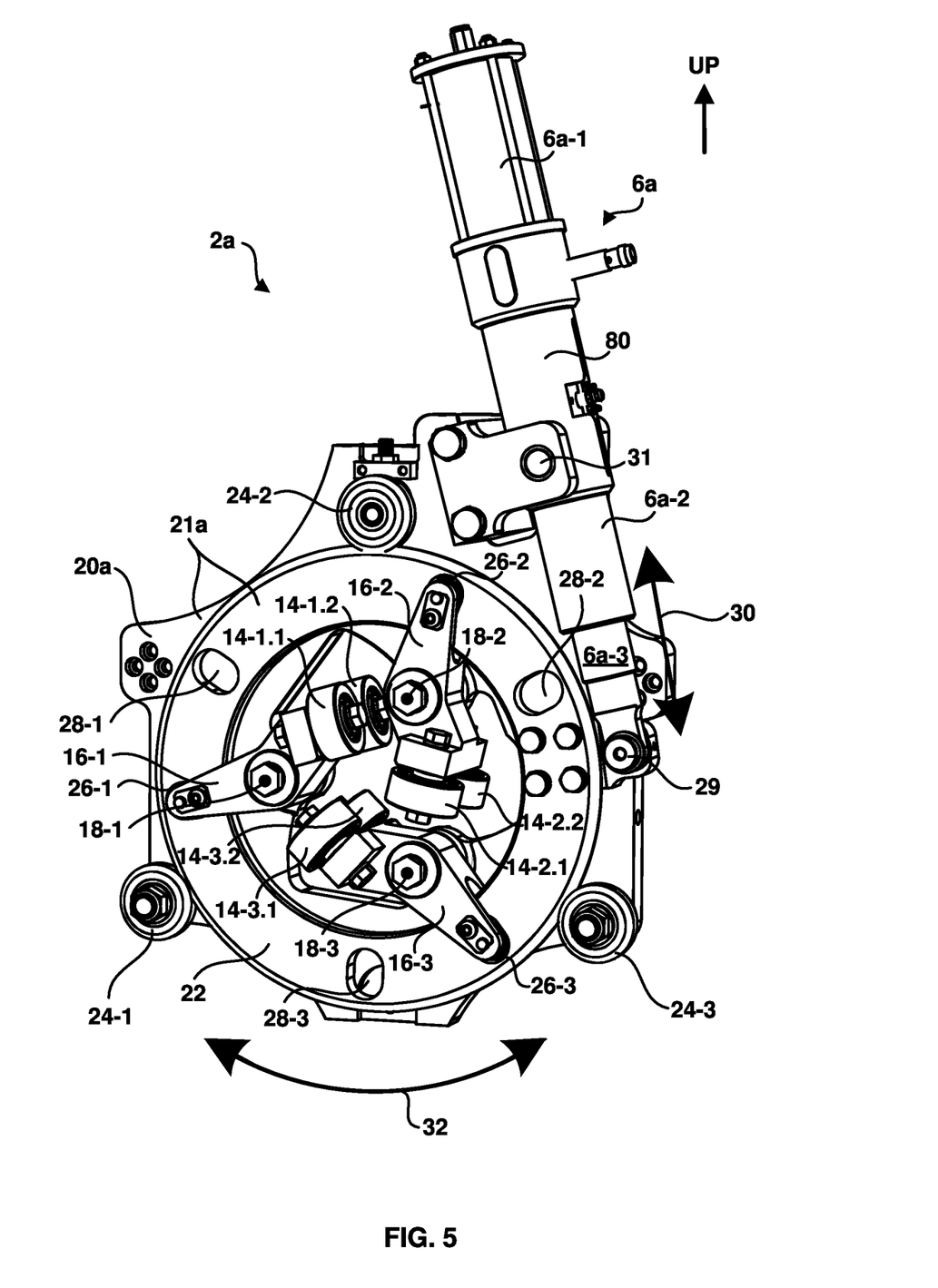
FIG. 5 is an isometric view of a centering assembly of the bar inspection system according to an example embodiment of the present disclosure.

Referring to FIG. 5, a more detailed isometric view of centering assembly 2a according to an example embodiment of the present disclosure. Note that the construction of centering assembly 2b may be identical to that of centering assembly 2a. Centering assembly 2a comprises main plate 20a and a centering ring plate 22. The combination of main plate 20a and a centering ring plate 22 is called a centering frame 21a. Centering arms, such as pivot arms 16-1, 16-2 and 16-3 have respective first ends, such as first end 16a-3, which are attached to centering ring plate 22 at arm joints, such as slots 26-1, 26-2 and 26-3 respectively, allowing linearly radial and rotational movement of the first ends of pivot arms 16-1, 16-2 and 16-3 within their respective slot. Centering assembly 2a further comprises six rollers which are configured to be in tangential contact with bar 34 under inspection and guide the passage of bar 34 through centering assembly 2a. The six rollers are configured in three pairs: rollers 14-1.1 and 14-1.2 are rotatably attached to a respective a second end of a pivot arm 16-1, rollers 14-2.1 and 14-2.2 are rotatably attached to a second end of a pivot arm 16-2 and rollers 14-3.1 and 14-3.2 are rotatably attached to a second end of a pivot arm 16-3. Pivot arms 16-1, 16-2 and 16-3 are pivotably attached to centering assembly main plate 20a at pivot points 18-1, 18-2 and 18-3 respectively (also shown in FIG. 1 and FIGS. 6A and 6B), each one of pivot points 18-1, 18-2 and 18-3 being located at an intermediate position between the first end and the second end of the respective pivot arm.

Note that slots 26-1, 26-2 and 26-3 are subject to wear due to the forces applied as bar 34 passes through centering assembly 2a. Such wear may cause alignment errors in alignment of the bar with the system axis 35. Preferably, ring plate 22 is configured to have three spare slots 28-1, 28-2 and 28-3, such that when wear on one or more of slots 26-1, 26-2 and 26-3 has become unacceptable, centering assembly 2a may be reassembled with the second ends of pivot arms 16-1, 16-2 and 16-3 attached to spare slots 28-1, 28-2 and 28-3 respectively. Thus, the useful life of ring plate 22 is effectively doubled.

Figure 6A:
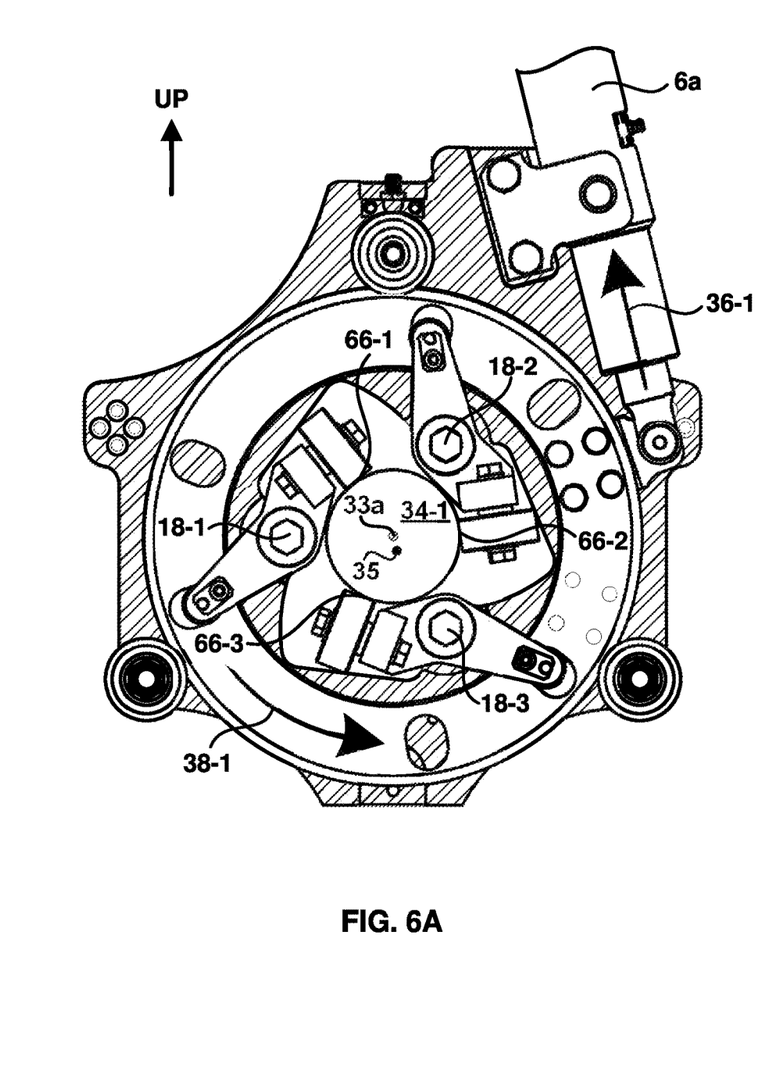
FIGS. 6A and 6B are views of the centering assembly when pivot arms are in fully open and closed positions, respectively.
Figure 6B:
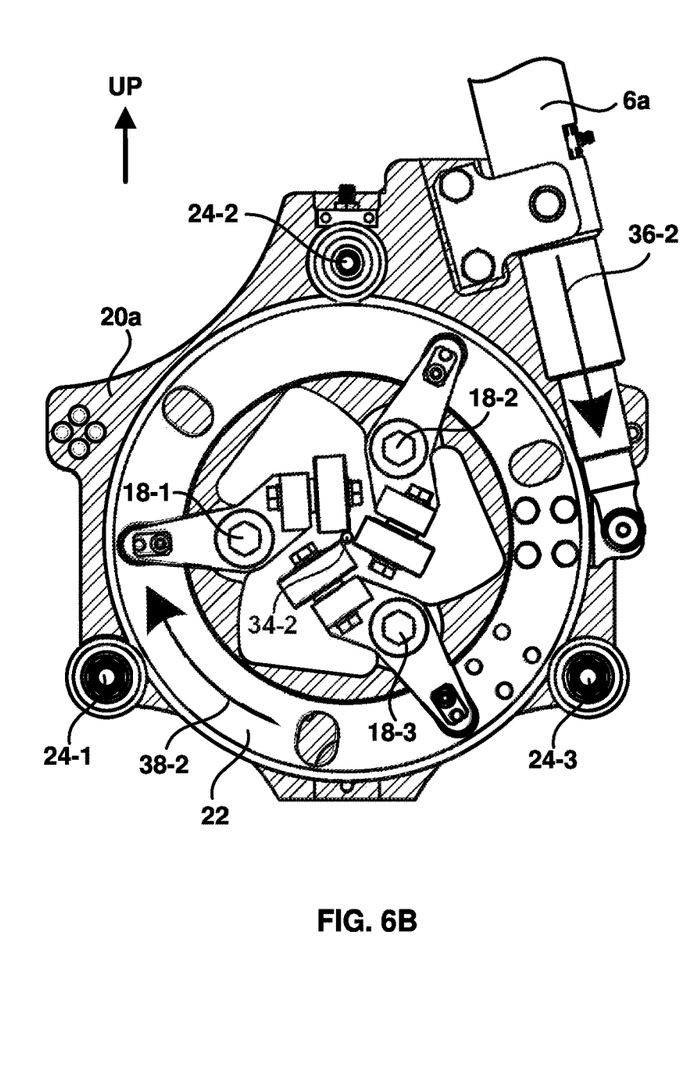

Referring to FIGS. 5, 6A and 6B, centering actuator 6a preferably is an elongated short bar, having three sections, a top, a mid and a bottom section, 6a-1, 6a-2 and 6a-3, respectively. Mid-section 6a-2 is enveloped inside a shell actuator cylinder 80. Shell actuator cylinder 80 is rotatably attached to centering assembly main plate 20a at an attachment bearing 31. The top section of centering actuator 6a is configured for the operator to maneuver by pressing or pulling the actuator 6a up or down relatively to the shell cylinder 80. The bottom section 6a-3 of centering actuator 6a is attach to ring plate 22 at an attachment point 29. Centering actuator 6a, when actuated with up and down motion, is configured to cause a relative rotational movement between ring plate 22 and centering assembly main plate 20a, which further causes the unison movements of pivot arms 16-1, 16-2 and 16-3. This is due to the movements of pivot arms 16-1, 16-2 and 16-3 are commonly caused by the same source of common relative movement between ring plate 22 and main plate 20a. Thus, linear actuation of centering actuator 6a in a direction indicated linear extension of the centering actuator 6a causes clockwise rotation of ring plate 22 and linear retracting of centering actuator 6a causes counter-clocking rotation of ring plate 22. Ring plate 22 is held and its rotation is guided by ring plate guide wheels 24-1, 24-2 and 24-3, the ring plate guide wheels being rotatably attached to centering assembly main plate 20a. Rotation of ring plate 22 causes rotation of each one of pivot arms 16-1, 16-2 and 16-3 about its respective pivot point. Extension of the linear length of centering actuator 6a causes a clockwise rotation of ring plate 22, the clockwise rotation causing rotation of pivot arms 16-1, 16-2 and 16-3, further causing the respective second ends of pivot arms all move symmetrically closer to the central axis of ring plate 22 in order for centering assembly 2a to accommodate a bar of smaller diameter. Similarly, contraction of the linear length of centering actuator 6a causes a counter-clockwise rotation of ring plate 22, the counter-clockwise rotation causing rotation of pivot arms 16-1, 16-2 and 16-3 such that rollers 14-1.1, 14-1.2, 14-2.1, 14-2.2, 14-3.1 and 14-3.2 all move in unison further from the central axis of ring plate 22 in order for centering assembly 2a to accommodate a bar of larger diameter.

It should be noted that the teachings disclosed in the exemplary embodiments herein described can be used to conjure other alternative uses and embodiments which are all within the scope of the present disclosure. For instance, the centering assembly can be designed to accommodate other elongated test objects, such as square bars, polygonal bars and tubes of many kinds, simply by devising an alternative number of pivot arms with equivalent configurations.

Reference now is made to FIG. 6A, which is a view of centering assembly 2a with pivot arms in a fully open position, in which centering actuator 6a is maximally retracted as shown by an arrow 36-1, and ring plate 22 is maximally rotated in a counter-clockwise direction as shown by an arrow 38-1. In the fully open position centering assembly 2a may accept a bar 34-1 having a maximum bar diameter. In an embodiment, the maximum bar diameter is 65 mm.

Still referring to FIG. 6A, and referring to FIG. 1, it should be the tangential contacts between bar 34-1 and respective rollers form the tangential contact points 66-1, 66-2 and 66-3. Contact points 66-1, 66-2 and 66-3 form a geometric circle which defines a contact-point axis 33a. FIG. 6A also illustrates a contact-point axis 33a corresponding to the center of the points of contact of the rollers with bar 34-1.

Note that, in example embodiments, pivot arms 16-1, 16-2 and 16-3 and associated rollers are mechanically identical. This enhances the symmetrical performance of centering assembly 2a, thereby improving the accuracy of definition of contact-point axis 33a of centering assembly 2a. Note that centering assembly 2b has a similarly defined contact-point axis 33b (not shown).

FIG. 6B is a view of centering assembly 2a in the fully closed position, in which centering actuator 6a is maximally extended as shown by an arrow 36-2, and ring plate 22 is maximally rotated in a clockwise direction as shown by an arrow 38-2. In the fully closed position centering assembly 2a may accept a bar 34-2 having a minimum bar diameter. In an example embodiment, the minimum bar diameter is 8 mm.

Note that, in example embodiments, centering actuator 6a is operated only to vary the opening between the rollers in order to inspect bars of different diameter. In order to inspect a bar of given diameter, centering actuator 6a is adjusted to set the opening between the rollers to be slightly smaller than the bar diameter. The opening between rollers is then increased by impact of a bar entering centering assembly 2a. Centering actuator 6a is spring loaded such that, after entry of the bar, there is a spring force in centering actuator 6a in the direction of arrow 36-2, and consequently the rollers are spring loaded in contact with the bar. The spring inside of actuator 6a is not shown as spring-loaded actuator is commonly known to those skilled in the art. Spring loading in centering actuator 6a keeps the rollers constrained on the bar, thereby minimizing alignment errors. An important part of the present disclosure is that a single source of force is used as the retention force is applied to ring plate 22, in this case the spring force, by the spring loading of centering actuator 6a. This single force is then symmetrically distributed to each of pivot arms 16-1, 16-2 and 16-3. Thus, unlike systems in existing practice, holding force on the bar is always unison among the pivot arms, thereby improving accuracy of centering of the bar.

It can be appreciated that the spring loading of centering actuator can be devised alternatively by a hydraulic force to make the actuator and hydraulic actuator. When actuated, the hydraulic actuator, transmits a hydraulic force to the ring plate and thereby to the pivot arms, causing a holding force on the test object. The hydraulic actuator itself is commonly known. Although not shown, this alternative design is within the scope of the present disclosure.

Figure 7A:
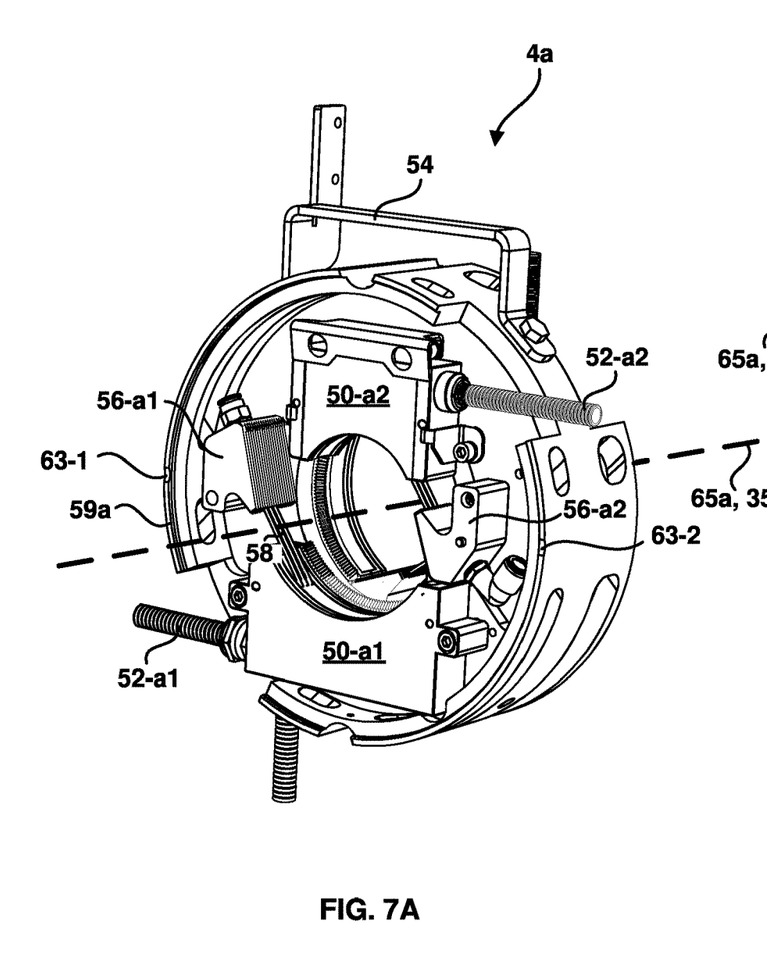
FIGS. 7A and 7B are respectively isometric views of a first side and a second side of an inspection cassette of the bar inspection system according to the present disclosure.
Figure 7B:
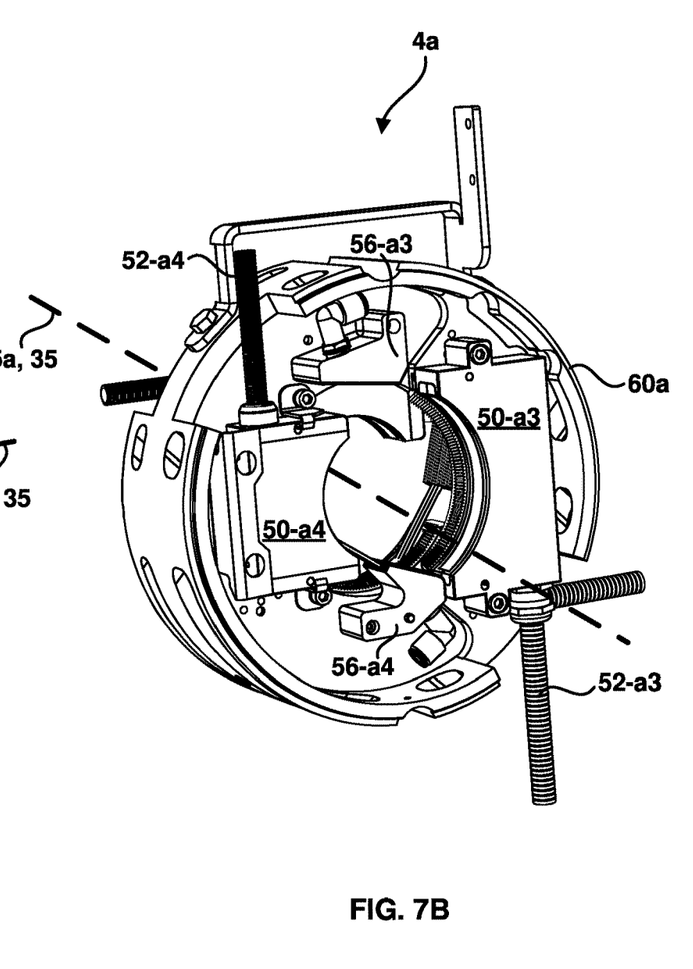

FIG. 7A is an isometric view of a first side of inspection cassette 4a and FIG. 7B is an isometric view of a second side of inspection cassette 4a. Inspection cassette 4a comprises ultrasonic array probes 50-a1 and 50-a2 located on the first side, and ultrasonic array probes 50-a3 and 50-a4 located on the second side. Probes 50-a1, 50-a2, 50-a3 and 50-a4 are configured to transmit ultrasonic energy into the bar under inspection and to receive echo signals from flaws in the bar. Each of probes 50-a1, 50-a2, 50-a3 and 50-a4 is connected to a control and acquisition unit (not shown) by means of cables 52-a1, 52-a2, 52-a3 and 52-a4 respectively.

The emitting and receiving surfaces of probes 50-a1, 50-a2, 50-a3 and 50-a4 may be curved with the center of curvature being aligned with a probe axis 65a. In an embodiment, probes 50-a1 and 50-a3 may have a radius of curvature of 61 mm for inspection of bars having diameter from 30 mm to 65 mm, and probes 50-a2 and 50-a4 may have a radius of curvature of 40 mm for inspection of bars having diameter from 8 mm to 40 mm.

Similarly, the construction of inspection cassette 4b may be substantially identical to that of inspection cassette 4a. Inspection cassette 4b, having a probe axis 65b (not shown), may comprise ultrasonic array probes 50-b1 and 50-b2 (not shown) located on a first side, and ultrasonic array probes 50-b3 and 50-b4 (not shown) located on a second side. Thus, bar inspection assembly 1 may comprise a total of eight probes configured to inspect bars of different diameter. In an embodiment, a bar of given diameter is inspected in pulse-echo mode using four active probes, there being one active probe on each side of inspection cassette 4a and one active probe on each side of inspection cassette 4b.

Still referring to FIGS. 7A and 7B, there are shown features of example embodiments of the present disclosure designed to comprise a pair of locking components to facilitate accurate alignment of the components of bar inspection assembly 1. FIG. 7A shows an exemplary embodiment in which inspection cassette 4a has a concave groove 59a as the first locking component on the first side and FIG. 7B shows that inspection cassette 4a has a convex ridge 60a, as the second locking component on the second side. Concave groove 59a is configured to align and mate with a convex ridge 60b (not shown) on inspection cassette 4b. Convex ridge 60a is configured to align and mate with a convex groove 61a (see FIG. 2) on centering assembly main plate 20a. Pivot stands 48a and 48b on pressure plate 12 are configured to align and mate with two corresponding reference indentations 63-1 and 63-2 (see FIG. 7A) on the surface of inspection cassette 4b. Thus, the mating features described herein ensure that probe axes 65a and 65b of inspection cassettes 4a, 4b and contact-point axes 33a and 33b of centering assemblies 2a, and 2b are aligned to each other and correspond to system axis 35.

It can be appreciated that the groove and ridge structure shown above in FIG. 7 can be configured in other embodiments featuring a locking assembly having corresponding male and female parts configured respectively on the ring plate and the probe cassette. This serves the same purpose of the groove 59a and the ridge 60b to lock the probe cassette to be concentric with the ring plate when the locking components is in an engaged position (shown as in FIG. 1).

Note that a center point midway between reference indentations 63-1 and 63-2 accurately defines probe axis 65a of inspection cassette 4a. Reference indentations 63-1 and 63-2 are used to ensure that ultrasonic array probes 50-a1, 50-a2, 50-a3 and 50-a4 are accurately aligned prior to use by means of an alignment jig (not shown). The alignment jig is constructed from an accurately machined single metal piece such that the jig is centered by contact with reference indentations 63-1 and 63-2. The accurately centered jig is then used to align each of the arc-shaped surfaces of ultrasonic array probes 50-a1, 50-a2, 50-a3 and 50-a4, such that the centers of curvature of each of the arc-shaped surfaces is accurately aligned with probe axis 65a of inspection cassette 4a.

In summary, it is a primary purpose of bar inspection assembly 1 to achieve alignment of contact-point-axes 33a and 33b of centering assemblies 2a and 2b with probe axes 65a and 65b of inspection cassettes 4a and 4b, respectively.

By completely stacking and nesting of probe cassettes with centering assemblies by means of pressure plate 12, probe axis 65a, probe axis 65b should all be aligned, and concentric with system central axis 35, which is defined by the center of centering assemblies 2a and 2b.

Further, the mechanical configuration of the plurality of pivot arms is identical in centering assemblies 2a and 2b, and the movements of the pivot arms are all caused by a single common displacement of actuator 6a or 6b, respectively. This assures to the largest degree that the location of contact-point axes 33a and 33b of the centering arms coincide with system axis 35, which is defined by that the center of centering assemblies 2a and 2b, respectively.

Centering assemblies 2a and 2b according to example embodiments of the present disclosure have the following advantages over centering mechanisms in conventional ultrasonic bar inspection systems:

- Use of ring plate 22, with rotation facilitated by ring plate guide wheels 24-1, 24-2 and 24-3, provides a symmetrical mechanism in which equal forces are applied to each of the pivot arms, and the forces are reduced by up to 50% relative to forces on the pivot arms in other prior art design.
- The symmetrical mechanism ensures that corresponding parts of the mechanism are subject to uniform wear.
- Positioning accuracy of contact-point axes 33a and 33b is greatly improved, allowing better accuracy of alignment with system central axis 35.
- Probe cassettes 4a and 4b may be easily installed into or removed from bar inspection assembly 1.

Note that centering assembly 6a is depicted in FIGS. 6A and 6B as being used for bars of circular cross-section. However, according to other example embodiments of the present disclosure, centering assembly 6a may be used for bars of hexagonal or triangular cross-section, and furthermore centering assembly 6a may be configured to accept bars of square or rectangular cross-section, and all such uses or configurations are within the scope of the present disclosure. In order to accept bars of square or rectangular cross-section, centering assembly 6a may be configured in yet other example embodiments of the present disclosure with three sets of pivot arms, each pivot arm having a pair of rollers at the second end, being slidably and rotatably attached to ring plate 22 at the first end, and being rotatably attached to centering assembly main plate 20a at a pivot point between the first end and the second end. In a further embodiment of the present disclosure, each of the three pivot arms may be slidably and pivotably attached to assembly main plate 20a at its respective pivot point, such that rotation of ring plate 22 causes each pair of rollers to move in a radial direction towards or away from contact-point axis 33a.

Referring to FIGS. 7A and 7B, when in use, bar inspection assembly 1 is immersed in a water tank (not shown) to maintain acoustic coupling. A bar passing through bar inspection assembly 1 first enters the water tank through an appropriately sealed aperture in the tank. In passing from air to water, air bubbles may become entrained on the surface of the bar and such bubbles may be transferred to the emitting and receiving surfaces of the array probes causing artefacts in the ultrasound images of the bar. Entrained bubbles are removed by bubble removers 56-a1, 56-a2, 56-a3 and 56-a4, wherein each of the bubble removers produces a water jet 58 within the water tank, the water jets being directed towards the surfaces of probes 50-a1, 50-a2, 50-a3 and 50-a4 respectively.

Inspection cassette 4a is equipped with a handle 54 to facilitate removal of the cassette from bar inspection assembly 1. Using handle 54, inspection cassette 4a may be lifted out of the assembly for purposes of maintenance or readjustment without disengaging rigid links 8a, 8b and 8c.

It should be noted that the teachings disclosed in the exemplary embodiments can be used to conjure other alternative uses and embodiments which are all within the scope of the present disclosure. For instance, the centering assembly can be designed to accommodate other kinds of elongated test objects, such as tubes and pipes of many kinds.

Although the present invention has been described in relation to particular embodiments thereof, it can be appreciated that various designs can be conceived based on the teachings of the present disclosure, and all are within the scope of the present disclosure.

What is claimed is:

1. A non-destructive inspection system configured to perform an inspection on a test object with a longitudinal shape being passed through the inspection system in a longitudinal direction, the inspection system comprising:
   a centering assembly comprising a centering frame centered around a system axis, positioned along a first radial plane, and having at least three centering arms having respective first ends attached to the centering frame at respective arm joints spaced substantially equally around the centering frame, the centering arms having respective second ends configured to hold and feed the test object at times the inspection system is in operation,
   a probe cassette, positioned along a second radial plane, configured to carry an inspection probe,
   a pair of locking components configured respectively on the centering frame and the probe cassette to align the probe cassette to be centered along a system axis when the locking components are in an engaged position,
   a pressure plate sandwiched between the centering frame and the probe cassette and configured with a pushing mechanism, which when actuated, pushes the probe cassette and the centering frame into the engaged position.

2. The inspection system of claim 1, wherein the centering frame further comprises a main plate and a centering ring plate and is configured to enable relative and circular movement between the main plate and the ring plate, and wherein the main plate has at least three ring guide wheels configured to hold the centering ring plate and guide the ring plate.

3. The inspection system of claim 2, wherein the at least three centering arms are pivot arms pivotably attached to the centering ring plate at the respective first ends, the arm joints are respective slots on the ring plate configured to allow the first ends to slidably pivot within, the pivot arms further comprising respective arm pivot points between the respective first ends and the second ends of the arms, the pivot points pivotably attaching the respective arms to the main plate.

4. The inspection system of claim 3, wherein the centering assembly further comprises a centering actuator, which upon being actuated, causes relative rotational movement between the centering ring plate and the main plate.

5. The inspection system of claim 4, wherein the centering actuator has a top section, a mid-section enveloped by a shell actuator cylinder which is rotatably anchored onto the main plate, and a lower end attached to the centering ring plate.

6. The inspection system of claim 5 wherein the pivot arms have substantially the same mechanical configuration, the relative rotational movement causes a unison rotation of each of the pivot arms about its respective arm pivot point at the main plate and translation of the respective first ends of each of the pivot arms at its respective arm joint at the centering ring plate.

7. The inspection system of claim 6, wherein the unison rotation includes the centering arms being swung more open or closed in unison.

8. The inspection system of claim 4, wherein the centering actuator is spring-loaded and is configured to exert a spring force on to the ring plate which, in turn, causes the pivot arms to apply a holding force to the test object.

9. The inspection system of claim 2, wherein the pair of locking components comprises a respective mating concave groove and convex ridge located on respective facing edges of the main plate and the probe cassette.

10. The inspection system of claim 9, wherein the pushing mechanism is configured to push the probe cassette and the ring plate together so that the ridge is engaged into the groove during the inspection.

11. The inspection system of claim 10, wherein the pushing mechanism comprises:
   a toggle clamp shaft disposed on a first side of the pressure plate at a first edge;
   a stopper disposed on the first side of the pressure plate at a second edge; and
   a pair of pivot stands configured on a second side but two opposite edges of the pressure plate in a fashion that a line connecting the toggle clamp shaft and the stopper is orthogonal to a line connecting the pair of pivot stands so that when the pushing mechanism is actuated, the toggle clamp shaft and the stopper causes an active and resistant force, respectively, and the pair of pivot stands function as fulcrums pushing the locking components together.

12. The inspection system of claim 11, wherein the pivot stands are installed on a peripheral edge of the pressure plate symmetrically about the system axis, and a connecting line connecting the pivot stands is in the same plane as the system axis.

13. The inspection system of claim 9, further comprising two or more rigid links to maintain the system in the engaged position in which the convex ridge is pushed into the concave groove.

14. The inspection system of claim 1, further comprising respective inspection probes configured to be attached to respective probe cassettes to at least partially encircle the test object.

15. The inspection system of claim 1, wherein the second ends of the pivot arms comprise rollers configured to facilitate the feeding of the test object to pass the inspection probe.

16. The inspection system of claim 1, wherein the test object is a round bar.

17. The inspection system of claim 1, wherein the test object is a square bar.

18. The inspection system of claim 1, wherein the test object is a polygonal bar.

19. The inspection system of claim 1, wherein the test object is a tubular structure.

20. A non-destructive testing centering assembly configured to perform an inspection on a test object with a longitudinal shape, the test object is fed through the centering assembly in a longitudinal direction at times of operation, the centering assembly comprising:
   a main plate positioned along a radial plane,
   a rigid circular centering ring plate attached onto a first side of the main plate in a manner to allow a relative circular movement between the rigid circular centering ring plate and the main plate, the rigid circular centering ring plate having at least three pivot arms having respective first ends pivotably attached to the rigid circular centering ring plate at respective pivotal joints spaced around the rigid circular centering ring plate, the pivot arms having respective second ends configured to tangentially engage the test object at times of operation; and
   at least three ring guide wheels spaced and installed on the first side of the main plate, the three ring guide wheels configured to hold the rigid circular centering ring plate and guide the relative circular movement of the rigid circular centering ring plate;
   wherein the at least three arms further comprise respective arm pivot points between the respective first ends and the second ends, the pivot points pivotably attaching the respective arms to the main plate.

21. The non-destructive testing centering assembly of claim 20 further comprises a centering actuator, when actuated, configured to cause the relative circular movement between the rigid circular centering ring plate and the main plate, which further causes unison movements of the at least three pivot arms.

* * * * *